(12) United States Patent
Jung et al.

(10) Patent No.: US 10,863,177 B2
(45) Date of Patent: Dec. 8, 2020

(54) VIDEO DECODING APPARATUS, COMPUTING SYSTEM INCLUDING THE SAME, AND VIDEO DECODING METHOD

(71) Applicant: Samsung Electronics Co., Ltd., Suwon-si (KR)

(72) Inventors: Young-Beom Jung, Seoul (KR); Jung Yeop Yang, Seoul (KR); Hyuk Jae Jang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/000,044

(22) Filed: Jun. 5, 2018

(65) Prior Publication Data

US 2019/0158831 A1    May 23, 2019

(30) Foreign Application Priority Data

Nov. 22, 2017  (KR) .......................... 10-2017-0156643

(51) Int. Cl.
*H04N 19/124* (2014.01)
*H04N 19/117* (2014.01)
*H04N 19/82* (2014.01)
*H04N 19/44* (2014.01)
*H04N 19/91* (2014.01)
*H04N 19/157* (2014.01)

(52) U.S. Cl.
CPC ......... *H04N 19/124* (2014.11); *H04N 19/117* (2014.11); *H04N 19/157* (2014.11); *H04N 19/45* (2014.11); *H04N 19/82* (2014.11); *H04N 19/91* (2014.11)

(58) Field of Classification Search
None
See application file for complete search history.

(56) References Cited

U.S. PATENT DOCUMENTS

| | | | |
|---|---|---|---|
| 7,660,355 B2 | 2/2010 | Winger et al. | |
| 7,944,968 B2 | 5/2011 | Winger | |
| 8,212,828 B2 | 7/2012 | Wells et al. | |
| 8,848,786 B2 * | 9/2014 | Cho | H04N 19/70 375/240.03 |
| 9,294,771 B2 * | 3/2016 | Gish | H04N 19/124 |
| 9,591,308 B2 | 3/2017 | Moriya et al. | |
| 9,635,365 B2 | 4/2017 | Zhou et al. | |
| 10,412,392 B2 * | 9/2019 | Jung | H04N 19/147 |
| 2006/0227866 A1 * | 10/2006 | Winger | H04N 19/176 375/240.03 |

(Continued)

*Primary Examiner* — Kate H Luo
(74) *Attorney, Agent, or Firm* — Harness, Dickey and Pierce, P.L.C.

(57) ABSTRACT

A video decoding apparatus, a computing system including the same, and a video decoding method. The video decoding apparatus may include an entropy decoder and a video decoder. The entropy decoder may be configured to obtain encoding information of a bitstream of an encoded video from a header of the bitstream, the encoding information of the bitstream including a bit depth of the bitstream, and convert a first quantization parameter of the bitstream into a second quantization parameter when the bit depth of the bitstream is different from a reference bit depth. The video decoder may be configured to decode the bitstream based on the second quantization parameter.

17 Claims, 11 Drawing Sheets

| $QP_I$ | $QS_I$ | | $QP_O$ | $QS_O$ |
|---|---|---|---|---|
| 0 | $QS_{I0}$ | | 0 | $QS_{O0}$ |
| 1 | $QS_{I1}$ | QP Conversion → | 1 | $QS_{O1}$ |
| ⋮ | ⋮ | | ⋮ | ⋮ |
| 62 | $QS_{I62}$ | | 50 | $QS_{O50}$ |
| 63 | $QS_{I63}$ | | 51 | $QS_{O51}$ |

(56) References Cited

U.S. PATENT DOCUMENTS

| | | | | |
|---|---|---|---|---|
| 2006/0227867 A1* | 10/2006 | Winger | ................ | H04N 19/139 |
| | | | | 375/240.03 |
| 2011/0116543 A1* | 5/2011 | Malvar | ................ | G06F 17/147 |
| | | | | 375/240.03 |
| 2013/0156311 A1* | 6/2013 | Choi | ...................... | H04N 9/642 |
| | | | | 382/166 |
| 2014/0086312 A1* | 3/2014 | Gish | .................... | H04N 19/124 |
| | | | | 375/240.03 |
| 2015/0319438 A1* | 11/2015 | Shima | ................... | H04N 19/176 |
| | | | | 375/240.03 |
| 2016/0029021 A1* | 1/2016 | Iwata | ................... | H04N 19/172 |
| | | | | 382/233 |
| 2016/0249062 A1* | 8/2016 | Zhou | ................... | H04N 19/176 |
| 2017/0150185 A1 | 5/2017 | Sze | | |

* cited by examiner

FIG. 5

| $QP_I$ | $QS_I$ |
|---|---|
| 0 | $QS_{I0}$ |
| 1 | $QS_{I1}$ |
| ⋮ | ⋮ |
| 62 | $QS_{I62}$ |
| 63 | $QS_{I63}$ |

→ QP Conversion →

| $QP_O$ | $QS_O$ |
|---|---|
| 0 | $QS_{O0}$ |
| 1 | $QS_{O1}$ |
| ⋮ | ⋮ |
| 50 | $QS_{O50}$ |
| 51 | $QS_{O51}$ |

FIG. 7

$$O_{ij} = I_{ij} << Bitdepth_I - Bitdepth_O$$
$$SAO\_OFFSET_O = SAO\_OFFSET_I << Bitdepth_I - Bitdepth_O$$

FIG. 10

$$O_{ij} = I_{ij} >> Bitdepth_I - Bitdepth_O$$
$$SAO\_OFFSET_0 = SAO\_OFFSET_1 >> Bitdepth_I - Bitdepth_O$$

VIDEO DECODING APPARATUS, COMPUTING SYSTEM INCLUDING THE SAME, AND VIDEO DECODING METHOD

This application claims the benefit of Korean Patent Application No. 10-2017-0156643, filed on Nov. 22, 2017, in the Korean Intellectual Property Office, the disclosure of which is incorporated herein in its entirety by reference.

BACKGROUND

1. Field

Example embodiments of the inventive concepts relate to a video decoding apparatus, a computing system including the same, and/or a video decoding method.

2. Description of the Related Art

With the development and dissemination of hardware capable of reproducing and storing high-resolution or high-definition video content, there is an increasing need for a video codec that effectively codes or decodes high-resolution or high-definition video content.

Standards such as H.264 Advanced Video Coding (AVC) and H.265/High Efficiency Video Coding (HEVC) have been established and actively used in video codecs for obtaining high compression efficiency and high image quality to encode and decode a video having a bit depth of 8 bits for each color channel. However, conventionally, it may be difficult to encode and decode a video having a bit depth of 10 bits or 12 bits for each color channel.

SUMMARY

Example embodiments of the inventive concepts provide a video decoding apparatus and/or method employed to decode video content having a bit depth greater than a bit depth that can be decoded by the apparatus.

Example embodiments of the inventive concepts also provide a computing system including a video decoding apparatus capable of decoding video content having a bit depth greater than a bit depth that can be decoded by the apparatus.

However, example embodiments of the inventive concepts are not restricted to the one set forth herein. The above and other aspects of example embodiments of the inventive concepts will become more apparent to one of ordinary skill in the art to which example embodiments of the inventive concepts pertain by referencing the detailed description given below.

According to an example embodiment of the inventive concepts, there is provided a video decoding apparatus. The video decoding apparatus may include an entropy decoder configured to, obtain encoding information of a bitstream of an encoded video from a header of the bitstream, the encoding information of the bitstream including a bit depth of the bitstream, and convert a first quantization parameter of the bitstream into a second quantization parameter when the bit depth of the bitstream is different from a reference bit depth; and a video decoder configured to decode the bitstream based on the second quantization parameter.

According to another example embodiment of the inventive concepts, there is provided a video decoding apparatus. The video decoding apparatus may include an entropy decoder configured to, obtain encoding information of a bitstream of an encoded video from a header of the bitstream, the encoding information including a bit depth of the bitstream, and convert a first quantization parameter of the bitstream into a second quantization parameter when the bit depth of the bitstream is greater than a reference bit depth; an adder configured to generate data of a spatial domain based on residue data, the residue data being restored using a quantization step size and data intra-predicted or inter-predicted from the bitstream, the quantization step size corresponding to the second quantization parameter when the bit depth of the bitstream is greater than the reference bit depth; and an sample adaptive offset (SAO) filter configured to generate a video output by performing SAO filtering on the data of the spatial domain based on the second quantization parameter and a decoding offset.

According to another example embodiment of the inventive concepts, there is provided a video decoding method. The video decoding method may include receiving a bitstream of an encoded video; obtaining a bit depth of the bitstream from encoding information included in a header of the bitstream; converting a first quantization parameter of the bitstream into a second quantization parameter based on the bit depth of the bitstream of the encoded video and a reference bit depth; and decoding the bitstream of the encoded video based on the second quantization parameter.

According to another example embodiment of the inventive concepts, there is provided a computing system. The computing system may include a memory configured to buffer video output; and a processor configured as a codec to, obtain encoding information of a bitstream of an encoded video data from a header of the bitstream, the encoding information including a bit depth of the bitstream, convert a first quantization parameter of the bitstream into a second quantization parameter when the bit depth of the bitstream is greater than a reference bit depth, generate data of a spatial domain based on residue data, the residue data being restored using a quantization step size and data intra-predicted or inter-predicted from the bitstream, the quantization step size corresponding to the second quantization parameter when the bit depth of the bitstream is greater than the reference bit depth, generate a video output by performing SAO filtering on the data of the spatial domain based on the second quantization parameter and a decoding offset, and store the video output in the memory.

BRIEF DESCRIPTION OF THE DRAWINGS

These and/or other aspects will become apparent and more readily appreciated from the following description of the embodiments, taken in conjunction with the accompanying drawings in which:

FIG. 5 is a diagram for explaining quantization parameter conversion performed by the video decoding apparatus according to the example embodiments;

FIG. 7 is a diagram for explaining transform coefficient conversion and offset conversion performed by the video decoding apparatus according to the example embodiments;

FIG. 10 is a diagram for explaining transform coefficient conversion and offset conversion performed by the video decoding apparatus according to the example embodiments.

DETAILED DESCRIPTION

The term 'unit' or 'module', as used herein, means, but is not limited to, a software or hardware component, such as a Field Programmable Gate Array (FPGA) or Application Specific Integrated Circuit (ASIC), which performs certain tasks. A unit or module may advantageously be configured to reside on an addressable non-transitory storage medium and configured to execute on one or more processors. Thus, a unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units or modules may be combined into fewer components and units or modules or further separated into additional components and units or modules.

The steps of a method or algorithm described in connection with the aspects disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of a non-transitory storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a user terminal.

Figure 1:
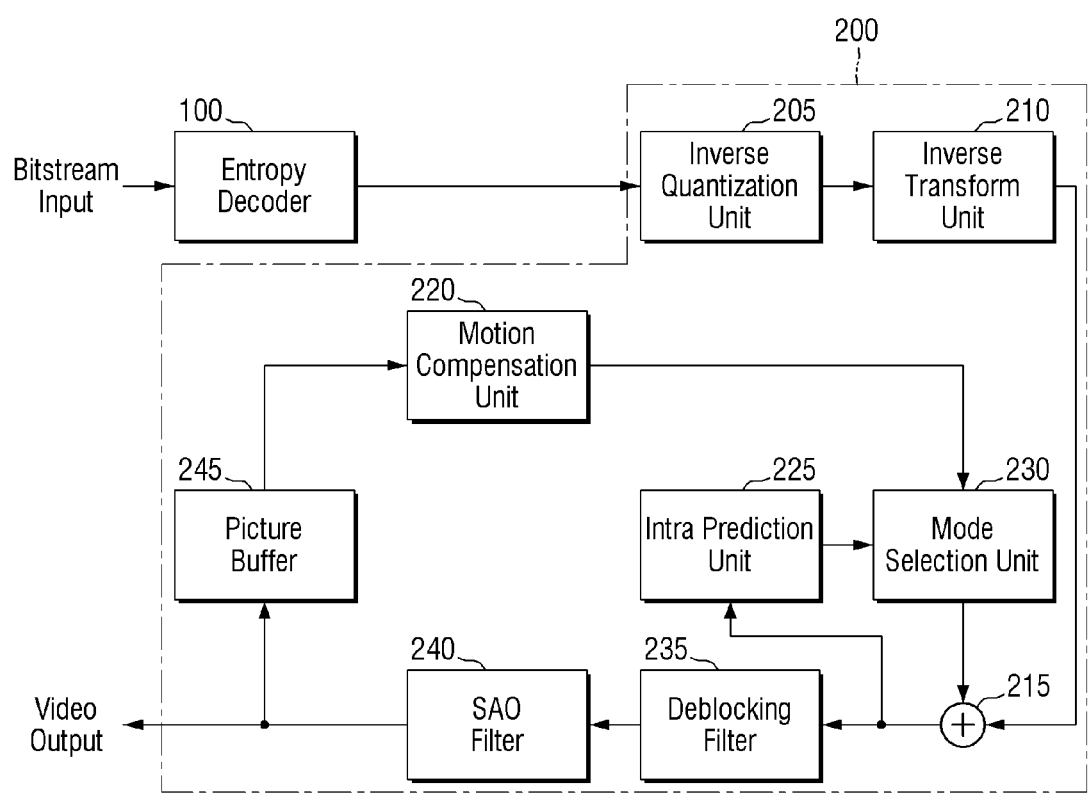
FIG. 1 is a block diagram of a video decoding apparatus according to example embodiments.

FIG. 1 is a block diagram of a video decoding apparatus according to example embodiments.

Referring to FIG. 1, the video decoding apparatus according to the example embodiments may include an entropy decoder 100 and a video decoder 200.

The entropy decoder 100 may receive a bitstream of encoded video data. The bitstream of the encoded video data may include, for example, a header containing attribute information of the encoded video data and a data portion containing content information of the encoded video data.

Here, the video data received by the entropy decoder 100 may be video data encoded by an H.264 Advanced Video Coding (AVC) protocol or an H.265 High Efficiency Video Coding (HEVC) protocol. However, example embodiments are not limited to this case, and the video data received by the entropy decoder 100 may also be video data encoded by other a video compression standards, such as H.261 or H.263 or by a format such as WebM or VP9.

In addition, the video data received by the entropy decoder 100 may be video data having, e.g., a bit depth of bits of a first size. The bits of the first size may include, for example, 8 bits, 10 bits, 12 bits, or 16 bits. If the video data received by the entropy decoder 100 is video data having a bit depth of 8 bits for each RGB color channel, it may have a bit depth of a total of 24 bits. The video data is not limited to the RGB format and may also be video data including color-difference signals such as YCbCr or YUV.

The entropy decoder 100 may entropy-decode the bitstream of the encoded video data and parse the header included in the bitstream of the encoded video data. The entropy decoder 100 may extract the attribute information, such as the bit depth of the encoded video data, from the parsed header and then process the extracted attribute information or provide the extracted attribute information to the video decoder 200. The operation of the entropy decoder 100 will be described in more detail later with reference to FIG. 3.

The video decoder 200 may decode the received bitstream of the encoded video data based on the attribute information received from the entropy decoder 100. The video decoder 200 may decode video data encoded by, e.g., the above-described video compression standard. In some example embodiments, the video decoder 200 may decode video data corresponding to a plurality of video compression standards. That is, the video decoder 200 may include, for example, multiple functional blocks that can decode different video compression standards. For example, the video decoder may include both a functional block that can decode video data encoded by H.264 AVC and a functional block that can decode video data encoded by H.265 HEVC.

The video decoder 200 may include an inverse quantization unit 205, an inverse transform unit 210, an adder 215, a motion compensation unit 220, an intra prediction unit 225, a mode selection unit 230, a deblocking filter 235, a sample adaptive offset (SAO) filter 240, and a picture buffer 245. A detailed description of each unit will be given later.

The bit depth of video data that can be decoded by the video decoder 200 may be different from the bit depth of encoded video data received by the entropy decoder 100. That is, the encoded video data received by the entropy decoder 100 may be video data having a bit depth of bits of the first size, and the video data that can be decoded by the video decoder 200 may be video data having a bit depth of bits of a second size.

When the video decoder 200 decodes video data having a bit depth of bits of the second size, it means that an operator included in the video decoder 200 can perform an operation on data having a bit size of the second size and/or that a data path or a register included in the video decoder 200 can process video data having a bit depth of bits of the second size. The bits of the second size may include, for example, 8 bits, 10 bits, 12 bits or 16 bits.

In some example embodiments the first size may be larger than the second size. The following description will be made based on the assumption that bits of the first size are larger than bits of the second size. For example, this may be a case where the entropy decoder 100 receives a bitstream of video data having a bit depth of 10 bits and where the video decoder 200 is capable of decoding video data having a bit depth of a maximum of 8 bits. Conventionally, when the bit depth of the first size is greater than the bit depth of the second size, a video decoder capable of decoding a bit depth of the second size may not be able to decode received video data having the bit depth of the first size.

However, the video decoding apparatus according to example embodiments may normally decode encoded video data having a bit depth of the first size without greatly changing the internal hardware structure by converting, e.g., a quantization coefficient of the encoded video data. The bit depth of the second size that can be decoded by the video decoder 200 will hereinafter be referred to as a reference bit depth BDO. Information about the reference bit depth BDO may be stored in a memory as profile information of the video decoder 200.

Figure 2:
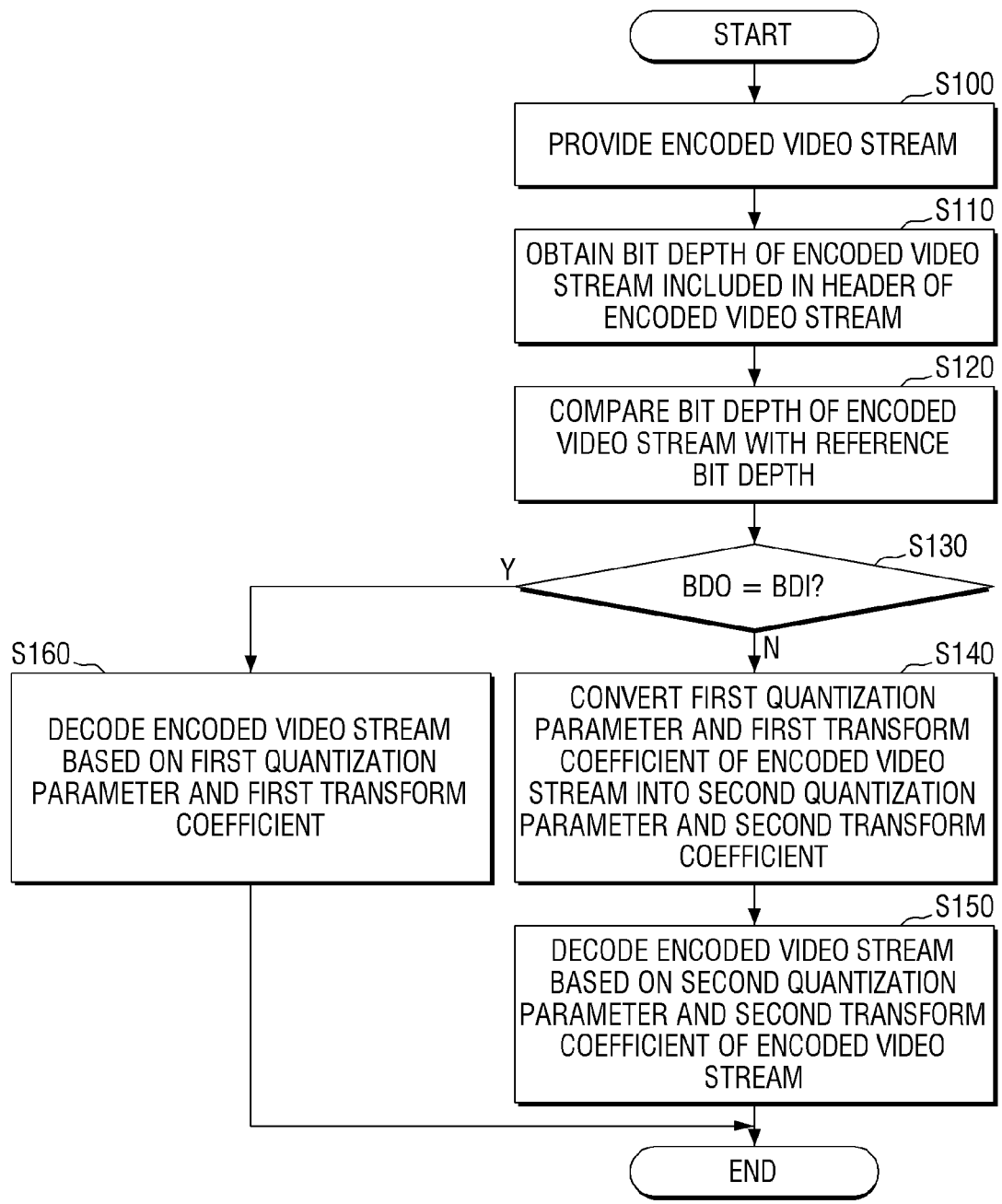
FIG. 2 is a flowchart illustrating a video decoding method according to example embodiments.

FIG. 2 is a flowchart illustrating a video decoding method according to embodiments.

Referring to FIG. 2, the video decoding apparatus may perform a video decoding method.

In operation S100, the entropy decoder 100 receives a bitstream of an encoded video.

In operation S110, the entropy decoder 100 may obtain a bit depth of video data included in a header of the bitstream of the encoded video.

In operation S120, the entropy decoder 100 may compare a bit depth BDI of the bitstream of the encoded video with a reference bit depth BDO, and, in operation S130, the entropy decoder 100 may determine whether the bit depth BDI of the bitstream of the encoded video is equal to the reference bit depth BDO.

In operation S140, the entropy decoder 100, may convert a first quantization parameter of the bitstream of the encoded video into a second quantization parameter, and, in operation S150, the entropy decoder 100 may decode the bitstream of the encoded video based on the second quantization parameter of the bitstream of the encoded video when the bit depth BDI of the bitstream of the encoded video is different from the reference bit depth BDO. Alternatively, in operation S160, the entropy decoder 100 may decode the encoded bitstream based on the first quantization parameter when the bit depth BDI of the encoded video stream is equal to the reference bit depth BDO.

The operation of the entropy decoder 100 will now be described in more detail with reference to FIG. 3.

Figure 3:
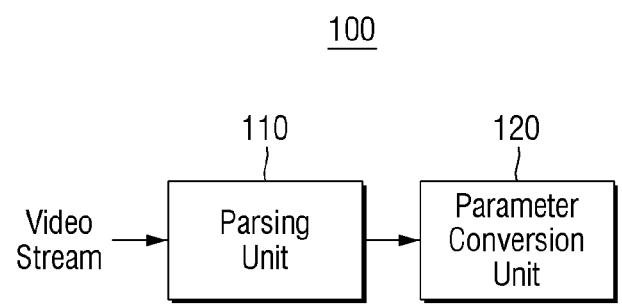
FIG. 3 is a block diagram of an entropy decoder included in the video decoding apparatus of FIG. 1.

FIG. 3 is a block diagram of the entropy decoder 100 included in the video decoding apparatus of FIG. 1.

Referring to FIG. 3, the entropy decoder 100 includes a parsing unit 110 and a parameter conversion unit 120. Although not illustrated in FIG. 3, the entropy decoder 100 may further include a block for entropy-decoding a bitstream of encoded video data.

The parsing unit 110 may parse a header included in a bitstream of an encoded video to obtain information about a bit depth BDI, a first quantization parameter QPI, a first transform coefficient Iij and a first offset SAO_OFFSETI for SAO filtering of the encoded video stream.

In some embodiments, if the video decoder 200 does not decode video data encoded by the H.265 HEVC standard, the obtaining of the offset information for SAO filtering may be omitted.

Of the information obtained by the parsing unit 110 through parsing, the bit depth BDI of the encoded video stream indicates that the encoded video stream has a bit depth of the first size.

The first quantization parameter QPI may have a corresponding first quantization step size QSI. The first quantization parameter QPI indicates that the encoded video stream has been encoded by the first quantization step size QSI corresponding to the first quantization parameter QPI and that the video data can be decoded by inversely quantizing the bitstream of the encoded video using the first quantization step size QSI.

The correspondence between the first quantization parameter QPI and the first quantization step size QSI will now be described in more detail with reference to FIG. 4.

Figure 4:
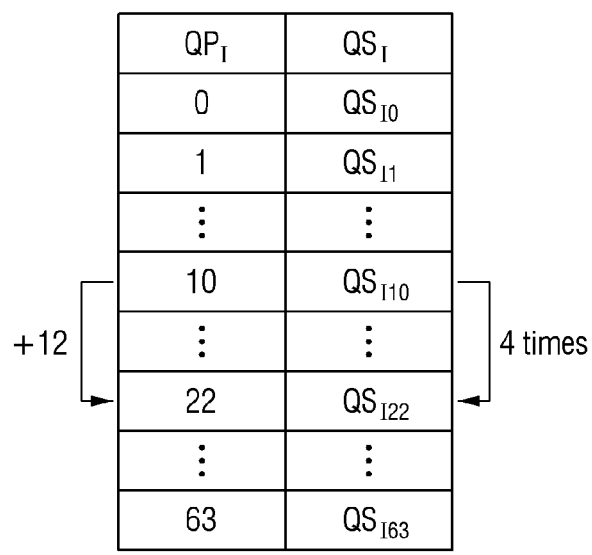
FIG. 4 illustrates quantization parameters and quantization step sizes used in the video decoding method according to the example embodiments.

FIG. 4 illustrates quantization parameters and quantization step sizes used in the video decoding method according to the embodiments.

Referring to FIG. 4, the correspondence between the first quantization parameter QPI and the first quantization step size QSI is recorded in a table. The table may be, for example, a lookup table (LUT).

In the table of FIG. 4, the first quantization parameter QPI is recorded in a left column. For example, when a bitstream of encoded video data has a bit depth of 10 bits, the first quantization parameter QPI may have a range of 0 to 63.

The first quantization step size QSI is recorded in a right column of the table. Specifically, when the first quantization parameter QPI is zero, the first quantization step size QSI is QSI0. In addition, when the first quantization parameter QPI is 63, the first quantization step size QSI is QSI63.

For example, the following approximate relationship may be established between the first quantization parameter $QP_I$ and the first quantization step size $QS_I$:

$$QS_I = 2^{QPI/6} \quad (1)$$

That is, as illustrated in FIG. 4, a proportional relationship of 4 times may be established between, for example, first quantization step sizes QSI10 and QSI22 corresponding to first quantization parameters of 10 and 22 having a difference of 12. This relationship may be used to convert the first quantization parameter QPI into the second quantization parameter QPO, which will be described later.

Referring back to FIG. 3, the first transform coefficient Iij is a quantized transform coefficient and may be restored to residue data by the inverse quantization unit 205 and the inverse transform unit 210.

For example, when the video decoding method according to the example embodiments is performed on a block having a size of 4×4 pixels, 16 first transform coefficients Iij may be included in one macroblock.

The first offset SAO_OFFSETI for SAO filtering may be used for SAO filtering performed by the SAO filter 240 on video data that has passed through the deblocking filter 235.

The parsing unit 110 provides the bit depth BDI, the first quantization parameter QPI, the first transform coefficient Iij and the first offset SAO_OFFSETI for SAO filtering of the encoded video stream to the parameter conversion unit 120.

The parameter conversion unit 120 compares the bit depth BDI of the encoded video stream with a reference bit depth BDO and determines whether the bit depth BDI of the encoded video stream is equal to the reference bit depth BDO (operations S120 and S130). When the bit depth BDI of the bitstream of the encoded video is not equal to the reference bit depth BDO, the parameter conversion unit 120 converts the first quantization parameter QPI and the first offset SAO_OFFSETI for SAO filtering of the encoded video stream into a second quantization parameter QPO and a second offset SAO_OFFSETO for SAO filtering, respectively (operation S140).

The parameter conversion unit 120 may determine whether the bit depth BDI of the encoded video stream received from the parsing unit 110 is equal to the reference bit depth BDO stored in the memory as the profile information of the video decoder 200.

FIG. 5 is a diagram for explaining quantization parameter conversion performed by the video decoding apparatus according to the embodiments.

In FIG. 5, tables for explaining the conversion of the first quantization parameter QPI into the second quantization parameter QPO by the parameter conversion unit 120 are illustrated.

The table on the left side of FIG. 5 is the same as the table of FIG. 4 showing the relationship between the first quantization parameter QPI and the first quantization step size QSI in a case where an encoded video stream has a bit depth of 10 bits. That is, the first quantization parameter QPI has a range of 0 to 63, and the first quantization step size QSI corresponding to the first quantization parameter QPI is also divided into 64 steps.

The table on the right side of FIG. 5 is a table showing the relationship between the second quantization parameter QPO and the second quantization step size QSO corresponding to the reference bit depth BDO. If the size of the reference bit depth BDO is 8 bits, the second quantization parameter QPO may have a range of 0 to 51. Accordingly, the second quantization step size QSO may be divided into 52 steps so as to correspond to the second quantization parameter QPO.

The first quantization step size QSI and the second quantization step size QSO corresponding to quantization parameters of the same value may be equal to each other. That is, a first quantization step size QSI10 and a second quantization step size QSO10 corresponding respectively to a first quantization parameter QPI of 10 and a second quantization parameter QPO of 10 may be equal to each other.

The parameter conversion unit 120 may convert the first quantization parameter QPI into the second quantization parameter QPO according to the following equation.

$$QPO=QPI+6\times(BDO-BDI)(QP1+6\times(BDO-BDI)\geq 0)= \\ QPI(QP1+6\times(BDO-BDI)<0) \qquad (2)$$

For example, when the bit depth BDI and the first quantization parameter QPI of a bitstream of encoded video data are 10 and 22, respectively, and the reference bit depth BDO is 8 bits, the parameter conversion unit 120 may determine that the second quantization parameter QPO is 10.

If the value of (QPI+6×(BDO−BDI)) is less than zero, the parameter conversion unit 120 may maintain the second quantization parameter QPO at the same value as the first quantization parameter QPI such that the value of the second quantization parameter QPO should be maintained at zero or more.

When the value of the second quantization parameter QPO is maintained at the value of the first quantization parameter QPI, the conversion of the first transform coefficient Iij may be necessary for the decoding of the encoded video stream. This will be described in detail later.

To correspond to the second quantization parameter QPO, the second quantization step size QSO also has a new value of QSO10 converted from QSI22.

Figure 6:
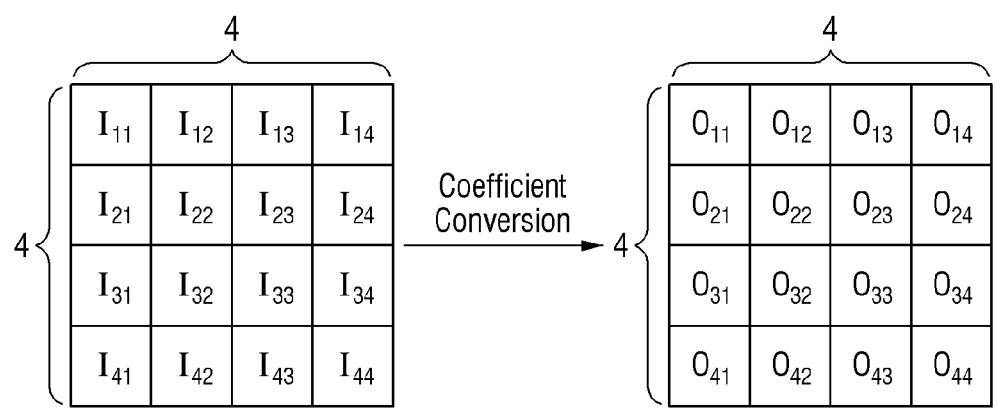
FIG. 6 is a diagram for explaining transform coefficient conversion performed by the video decoding apparatus according to the example embodiments.

FIG. 6 is a diagram for explaining transform coefficient conversion performed by the video decoding apparatus according to the embodiments, and FIG. 7 is a diagram for explaining transform coefficient conversion and offset conversion performed by the video decoding apparatus according to the embodiments.

Referring to FIG. 6, the conversion of the first transform coefficient Iij into a second transform coefficient Oij when a macroblock having a size of, e.g., 4×4 pixels is decoded is illustrated. Here, i and j are natural numbers of 1 to 4. The macroblock having the size of 4×4 pixels in FIG. 6 is only an example and can also have pixel sizes of 8×8, 16×16, and the like.

When each pixel has a corresponding first transform coefficient Iij, the bit depth BDI of a bitstream of an encoded video is not equal to the reference bit depth BDO, and the value of the second quantization parameter QPO is kept equal to the value of the first quantization parameter QPI in Equation 2, the parameter conversion unit 120 may convert the first transform coefficient Iij of each pixel into the second transform coefficient Oij in order to decode the bitstream of the encoded video. The first transform coefficient Iij of the bitstream of the encoded video may be converted into the second transform coefficient Oij using a bit shift operation as illustrated in FIG. 7.

More specifically, the first transform coefficient Iij may be converted into the second transform coefficient Oij by bit-shifting the first transform coefficient Iij by the number of bits corresponding to the difference between the bit depth BDI of the bitstream of the encoded video and the reference bit depth BDO.

Assuming that the bit depth BDI of the bitstream of the encoded video is greater than the reference bit depth BDO in the current embodiments as described above, the second transform coefficient Oij may be generated by bit-left-shifting the first transform coefficient Iij by the number of bits corresponding to the difference between the bit depth BDI of the bitstream of the encoded video and the reference bit depth BDO.

Similarly, the first offset SAO_OFFSETI for SAO filtering may be converted into the second offset SAO_OFFSETO for SAO filtering by bit-shifting the first offset SAO_OFFSETI for SAO filtering by the number of bits corresponding to the difference between the bit depth BDI of the bitstream of the encoded video and the reference bit depth BDO.

Assuming that the bit depth BDI of the bitstream of the encoded video is greater than the reference bit depth BDO in the example embodiments as described above, the second offset SAO_OFFSETO for SAO filtering may be generated by bit-left-shifting the first offset SAO_OFFSETI for SAO filtering by the number of bits corresponding to the difference between the bit depth BDI of the bitstream of the encoded video and the reference bit depth BDO.

If the video decoder 200 does not decode video data encoded by the H.265 HEVC standard as described above, the conversion of the first offset SAO_OFFSETI for SAO filtering into the second offset SAO_OFFSETO may be omitted.

The entropy decoder 100 may provide the video decoder 200 with the second quantization parameter QPO, the second transform coefficient Oij and the second offset SAO_OFFSETO for SAO filtering, together with the bitstream of the encoded video.

Decoding the bitstream of the encoded video using the video decoder 200 will now be described with reference to FIGS. 1 and 3 again.

The video decoder 200 decodes the bitstream of the encoded video using the second quantization parameter QPO of the bitstream of the encoded video.

The inverse quantization unit 205 may receive an entropy-decoded bitstream from the entropy decoder 100 and inversely quantize the bitstream using the second quantization parameter QPO. The inverse quantization unit 205 provides the inversely quantized video data to the inverse transform unit 210.

The inverse transform unit 210 restores and outputs residue data by inversely transforming the inversely quantized video data. If the first transform coefficient Iij is converted into the second transform coefficient Oij by the parameter conversion unit 120 as described above, the inverse transform unit 210 may inversely transform the inversely quantized video data using the second transform coefficient Oij.

Since the inverse quantization unit 205 and the inverse transform unit 210 decode the bitstream of the encoded video using the second quantization parameter QPO corresponding to the reference bit depth BDO, the encoded video data having a bit depth of the first size can be decoded by the video decoder 200. That is, the video decoder 200 does not need to include a decoding module for the encoded video data having the bit depth of the first size. Therefore, the complexity of the circuit configuration of the video decoder 200 can be reduced.

When the size of the bit depth BDI of the bitstream of the encoded video is equal to that of the reference bit depth BDO, the bitstream of the encoded video data may be decoded based on the first quantization parameter QPI and the first transform coefficient Iij.

The processing of the video data after the residue data is restored by the inverse quantization unit 205 and the inverse transform unit 210 will now be described with reference to FIG. 8.

Figure 8:
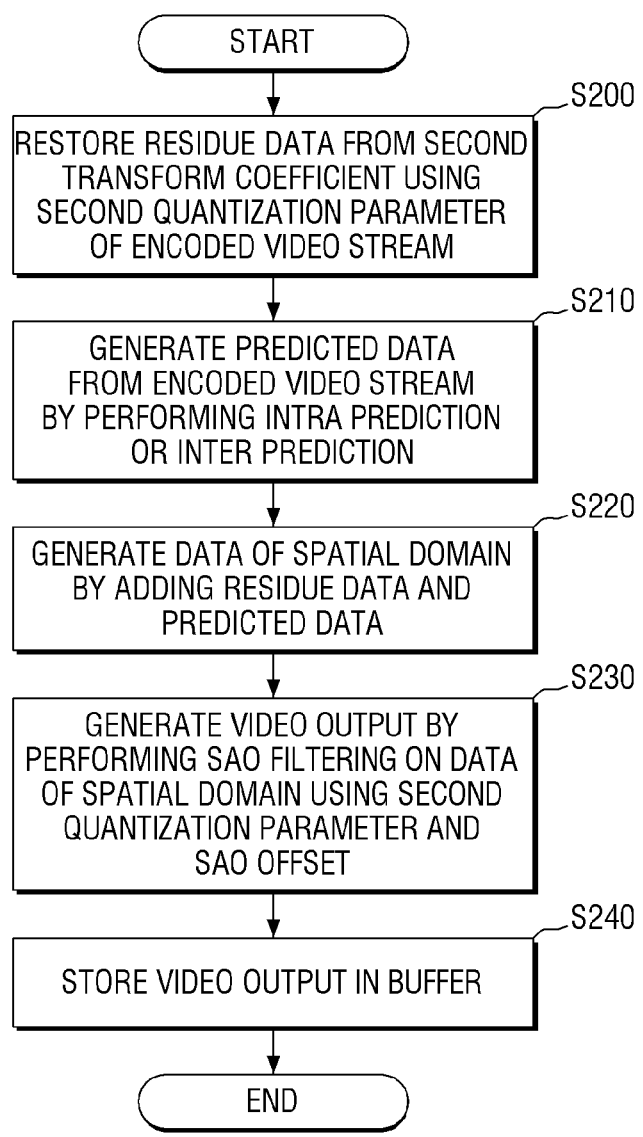
FIG. 8 is a flowchart illustrating a video decoding method according to example embodiments.

FIG. 8 is a flowchart illustrating a video decoding method according to example embodiments.

Referring to FIG. 8, the video decoding apparatus may perform the video decoding method according to the example embodiments.

In operation S200, the video decoder 200 may restore residue data from the second transform coefficient Oij using the second quantization parameter QPO of a bitstream of an encoded video.

In operation S210, the video decoder 200 may generate predicted data from the encoded video stream by performing intra prediction or inter prediction.

For example, the intra prediction unit 225 performs intra prediction on an intra-mode encoding unit on a prediction unit-by-prediction unit basis. The intra prediction unit 225 may provide an intra-predicted block to the mode selection unit 230. Since the intra prediction unit 225 receives video data restored by the adder 215, it can provide the mode selection unit 230 with a block predicted using an already encoded block within the same frame.

The motion compensation unit 220 may receive position information of a block that best matches a current block in the spatial domain among previous blocks included in a previous frame stored in the picture buffer 245 and read the block corresponding to the position information from a frame buffer. The motion compensation unit 220 may provide the read block to the mode selection unit 230.

The mode selection unit 230 may receive the intra-predicted block from the intra prediction unit 225 and the read block from the motion compensation unit 220. The mode selection unit 230 may generate predicted data by selecting any one of the two blocks.

In operation S220, the video decoder 200 may generate data of a spatial domain by adding the residue data and the predicted data.

For example, the adder 215 may generate data of the spatial domain by adding the residue data received from the inverse transform unit 210 and the predicted data received from the mode selection unit 230. The data of the spatial domain generated by the adder 215 may be provided to the motion compensation unit 220 and the deblocking filter 235.

In operation S230, the video decoder 200 may generate a video output from the data of the spatial domain by using the second quantization parameter QPO and the second offset SAO_OFFSETO for SAO filtering.

For example, the deblocking filter 235 may deblock the received data of the spatial domain. The deblocking filter 235 may transmit the deblocked data to the SAO filter 240.

The SAO filter 240 may perform SAO filtering using the second quantization parameter QPO and the second offset SAO_OFFSETO for SAO filtering.

Since the first quantization parameter QPI and the first offset SAO_OFFSETI for SAO filtering have been respectively converted into the second quantization parameter QPO and the second offset SAO_OFFSETO for SAO filtering by the entropy decoder 100, the SAO filter 240 can perform SAO filtering on the data of the spatial domain formed by decoding the video data having the bit depth of the first size.

In operation S240, the video decoder 200 may store the video output in a buffer.

For example, if the video decoder 200 does not decode video data encoded by the H.265 HEVC standard as described above, the SAO filter 240 may be omitted, and the deblocking filter 235 may directly transmit the deblocked video data to the picture buffer 245.

Alternatively, if the video decoder 200 does decode video data encoded by the H.265 HEVC standard as described above, the SAO filter 240 may output the SAO-filtered video data and store the SAO-filtered video data in the picture buffer 245.

The video data stored in the picture buffer 245 may be read and transmitted to the motion compensation unit 220 at the request of the motion compensation unit 220.

Figure 9:
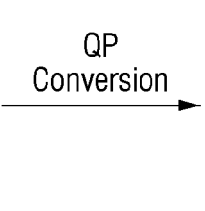
FIG. 9 is a diagram for explaining quantization parameter conversion performed by the video decoding apparatus according to the example embodiments.

FIG. 9 is a diagram for explaining transform coefficient conversion and offset conversion performed by the video decoding apparatus according to the example embodiments, and FIG. 10 is a diagram for explaining transform coefficient conversion and offset conversion performed by the video decoding apparatus according to the example embodiments.

Referring to FIGS. 9 and 10, although the case where the bit depth BDI of input video data is greater than the reference bit depth BDO has been described above, the conversion of a quantization parameter, a transform coefficient, and an offset for SAO filtering may also be performed in a case where the bit depth BDI of the input video data is smaller than the reference bit depth BDO.

For example, in general, when the bit depth BDI of the input video data is smaller than the reference bit depth BDO, the video decoder 200 may directly decode a bitstream of the input video data.

However, there may be cases where the video decoder 200 cannot directly decode the input video data because the video decoder 200 supports range extension (RExt) of HEVC, but the profile of the input video data is a baseline profile or a main profile that does not support the RExt.

To solve this problem, the first quantization parameter QPI, the first transform coefficient Iij and the first offset SAO_OFFSETI for SAO filtering of the encoded video data may be converted into the second quantization parameter QPO, the second transform coefficient Oij and the second offset SAO_OFFSETO for SAO filtering.

FIGS. 9 and 10 illustrate an example where the bit depth of the encoded video data is 8 bits which is smaller than the reference bit depth BDO of 10 bits.

A table on the left side of FIG. 9 is the same as a table showing the relationship between the first quantization parameter QPI and the first quantization step size QSI in a case where an encoded video stream has a bit depth of 8 bits. That is, the first quantization parameter QPI has a range of 0 to 51, and the first quantization step size QSI corresponding to the first quantization parameter QPI is also divided into 52 steps.

A table on the right side of FIG. 9 is a table showing the relationship between the second quantization parameter QPO and the second quantization step size QSO corresponding to the reference bit depth BDO. If the size of the reference bit depth BDO is 10 bits, the second quantization parameter QPO may have a range of 0 to 63. Accordingly, the second quantization step size QSO may be divided into 64 steps so as to correspond to the second quantization parameter QPO.

The parameter conversion unit 120 may convert the first quantization parameter QPI into the second quantization parameter QPO according to Equation 2 above. To correspond to the second quantization parameter QPO, the second quantization step size QSO also has a new value of QSO022 converted from QSI10.

Assuming that the bit depth BDI of a bitstream of an encoded video is smaller than the reference bit depth BDO as described in the current embodiments, the second transform coefficient Oij may be generated by bit-right-shifting the first transform coefficient Iij by the number of bits corresponding to the difference between the bit depth BDI of the bitstream of the encoded video and the reference bit depth BDO.

Similarly, assuming that the bit depth BDI of the bitstream of the encoded video is smaller than the reference bit depth BDO as described in the current embodiments, the second offset SAO_OFFSETO for SAO filtering may be generated by bit-right-shifting the first offset SAO_OFFSETI for SAO filtering by the number of bits corresponding to the difference between the bit depth BDI of the bitstream of the encoded video and the reference bit depth BDO.

Figure 11:
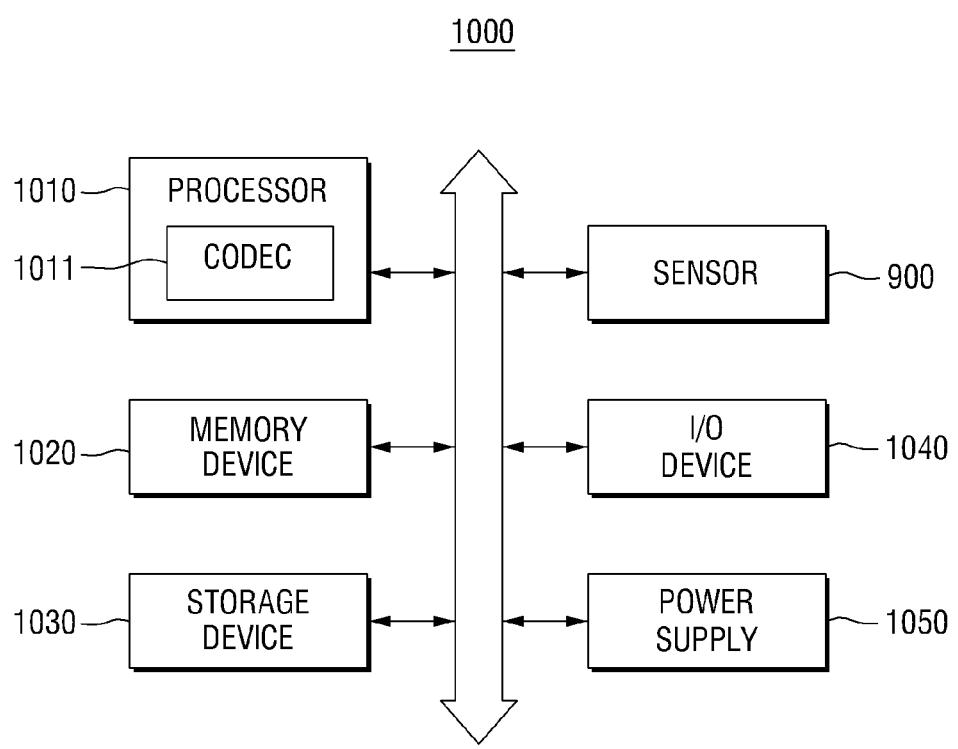
FIG. 11 is a block diagram of a computing system including a video decoding apparatus according to example embodiments.

FIG. 11 is a block diagram of a computing system 1000 including a video decoding apparatus according to embodiments.

Referring to FIG. 11, the computing system 1000 may include a processor 1010, a memory device 1020, a storage device 1030, an input/output (I/O) device 1040, a power supply 1050, and a sensor 900. The computing system 1000 may further include ports that can communicate with a video card, a sound card, a memory card, a universal serial bus (USB) device, or other electronic devices.

The processor 1010 may perform certain calculations or tasks. The processor 1010 may include a video codec 1011. The video codec 1011 may include the video decoding apparatus described above with reference to FIGS. 1 through 10. In addition, the video codec 1011 may further include a video encoding apparatus for encoding video data that can be decoded by the video decoding apparatus. The video encoding apparatus and the video decoding apparatus can be integrated with each other.

According to example embodiments, the processor 1010 may be a micro-processor or a central processing unit (CPU). Alternatively, the processor 1010 may be a graphic processing unit (GPU) or an image signal processor (ISP).

The processor 1010 may communicate with the memory device 1020, the storage device 1030, the photographing device 900 and the I/O device 1040 through an address bus, a control bus, and a data bus.

According to some example embodiments, the processor 1010 may also be connected to an extension bus such as a peripheral component interconnect (PCI) bus.

The memory device 1020 may store data necessary for the operation of the computing system 1000. For example, the memory device 1020 may be implemented as a DRAM, a mobile DRAM, an SRAM, a PRAM, an FRAM, an RRAM, and/or an MRAM. For example, the memory device 1020 may include a memory space allocated to the picture buffer 245 described above.

The processor 1010 may control restored video data to be stored in the memory space allocated as the picture buffer 245 in the memory device 1020.

The storage device 1030 may include a solid state drive, a hard disk drive, a CD-ROM, etc. The I/O device 1040 may include input units such as a keyboard, a keypad and a mouse and output units such as a printer and a display.

The power supply 1050 may apply an operating voltage required for the operation of the computing system 1000.

The sensor 900 may be a photographing device connected to the processor 1010 by the buses or other communication links to perform communication. The sensor 900 may be integrated on a single chip together with the processor 1010. Alternatively, the sensor 900 and the processor 1010 may be integrated on different chips, respectively.

The computing system 1000 can be implemented as various forms of packages. For example, at least some elements of the computing system 1000 may be mounted using packages such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), thin quad flat pack (TQFP), system in package (SIP), multi-chip package (MCP), wafer-level fabricated package (WFP), and wafer-level processed stack package (WSP).

The computing system 1000 may be interpreted as any computing system that performs a video decoding method according to example embodiments. Examples of the computing system 1000 include a digital camera, a smartphone, a mobile phone, and a personal digital assistant (PDA).

While example embodiments of the inventive concepts have been particularly shown and described with reference to some example embodiments thereof, it will be understood by those of ordinary skill in the art that various changes in form and detail may be made therein without departing from the spirit and scope of example embodiments of the inventive concepts as defined by the following claims. The example embodiments should be considered in a descriptive sense only and not for purposes of limitation.

According to one or more example embodiments, the units and/or devices described above, such as the components of the decoding apparatus including the entropy decoder 100 and the video decoder 200 and the sub-components of each of the above, may be implemented using hardware, a combination of hardware and software, or a non-transitory storage medium storing software that is executable to perform the functions of the same. The entropy decoder 100 and the video decoder 200 may be embodied in the same hardware platform or in separate hardware platforms.

The video decoder 200 may include a video codec. The video codec may be implemented within hardware, software, firmware, a DSP, a microprocessor, a processor executing code to configure the processor as a special purpose processor, an application specific integrated circuit (ASIC), a field programmable gate array (FPGA), discrete hardware components, or various combinations thereof.

Hardware may be implemented using processing circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including tangible or non-transitory computer-readable storage media as discussed herein.

Storage media may also include one or more storage devices at units and/or devices according to one or more example embodiments. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of example embodiments.

What is claimed is:

1. A video decoding apparatus comprising:
an entropy decoder including processing circuitry configured to decode data of a bit depth by,
obtaining encoding information of a bitstream of an encoded video from a header of the bitstream, the encoding information of the bitstream including the bit depth of the bitstream, and
when the bit depth of the bitstream is different from a reference bit depth, converting a first quantization parameter of the bitstream into a second quantization parameter based on a relationship between the first quantization parameter and a first quantization step size and a difference between the reference bit depth and the bit depth of the bitstream such that the relationship between the first quantization parameter and the first quantization step size is $QS_I = 2^{QSP/6}$ when the bit depth of the bitstream is 10 bits and the reference bit depth is 8 bits, where $QS_I$ is the first quantization step size and $QP_I$ is the first quantization parameter, the second quantization parameter having a different value than the first quantization parameter; and a video decoder including processing circuitry configured to decode data of the reference bit depth by, receiving the second quantization parameter and the bitstream, and decoding the bitstream having the bit depth based on at least the second quantization parameter.

2. The video decoding apparatus of claim 1, wherein the video decoder comprises:

an adder including processing circuitry configured to generate data of a spatial domain based on residue data, the residue data being restored from a second transform coefficient of the bitstream using the second quantization parameter and data intra-predicted or inter-predicted from the bitstream; and a sample adaptive offset (SAO) filter including processing circuitry configured to generate a video output by performing SAO filtering on the data of the spatial domain based on the second quantization parameter and a second offset.

3. The video decoding apparatus of claim 2, wherein the entropy decoder is configured to generate the second offset by bit-shifting the first offset by the difference between the bit depth of the bitstream and the reference bit depth, when the bit depth of the bitstream is different from the reference bit depth.

4. The video decoding apparatus of claim 2, wherein entropy decoder is configured to generate the second transform coefficient by bit-shifting a first transform coefficient of the bitstream by the difference between the bit depth of the bitstream and the reference bit depth, when the bit depth of the bitstream is different from the reference bit depth.

5. The video decoding apparatus of claim 4, wherein the video decoder is configured to restore the residue data from the second transform coefficient of the bitstream based on a second quantization step size corresponding to the second quantization parameter.

6. The video decoding apparatus of claim 4, wherein the entropy decoder is configured not to convert the first quantization parameter and the first transform coefficient when the bit depth of the bitstream is less than the reference bit depth.

7. The video decoding apparatus of claim 1, wherein the entropy decoder is configured to convert the first quantization parameter into the second quantization parameter based on:

$$QP_O = QP_I + 6 \times (BD_O - BD_I)(QP1 + 6 \times (BD_O - BD_I) \geq 0)$$
$$= QP1 \, (QP_I + 6 \times (BD_O - BD_I) < 0),$$

where $QP_I$ and $QP_O$ are the first quantization parameter and the second quantization parameter of the bitstream, respectively, and $BD_I$ and $BD_O$ are the bit depth of the bitstream and the reference bit depth, respectively.

8. The video decoding apparatus of claim 7, wherein the entropy decoder is configured to convert a first transform coefficient of the bitstream into a second transform coefficient such that the second quantization parameter is same as the first quantization parameter when a value of $(QP_I + 6 \times (BD_O - BD_I))$ is less than zero.

9. A video decoding apparatus comprising:

an entropy decoder including processing circuitry configured to decode data of a bit depth by, obtaining encoding information of a bitstream of an encoded video from a header of the bitstream, the encoding information including the bit depth of the bitstream, and when the bit depth of the bitstream is greater than a reference bit depth, converting a first quantization parameter of the bitstream into a second quantization parameter based on a relationship between the first quantization parameter and a first quantization step size and a difference between the reference bit depth and the bit depth of the bitstream such that the relationship between the first quantization parameter and the first quantization step size is $QS_I = 2^{QPI/6}$ when the bit depth of the bitstream is 10 bits and the reference bit depth is 8 bits, where $QS_I$ is the first quantization step size and $QP_I$ is the first quantization parameter, the second quantization parameter having a different value than the first quantization parameter;

an adder including processing circuitry configured to generate data of a spatial domain based on residue data, the residue data being restored using a second quantization step size and data intra-predicted or inter-predicted from the bitstream, the second quantization step size corresponding to the second quantization parameter when the bit depth of the bitstream is greater than the reference bit depth; and a sample adaptive offset (SAO) filter including processing circuitry configured to generate a video output by performing SAO filtering on the data of the spatial domain based on the second quantization parameter and a second offset.

10. The video decoding apparatus of claim 9, wherein the entropy decoder is configured to generate the second offset by bit-left-shifting a first offset by the difference between the bit depth of the bitstream and the reference bit depth, when the bit depth of the bitstream is greater than the reference bit depth.

11. The video decoding apparatus of claim 9, wherein the entropy decoder is configured to convert the first quantization parameter into the second quantization parameter based on:

$$QP_O = QP_I + 6 \times (BD_O - BD_I)(QP1 + 6 \times (BD_O - BD_I) \geq 0)$$
$$= QP1 \, (QP_I + 6 \times (BD_O - BD_I) < 0),$$

where $QP_I$ and $QP_O$ are the first quantization parameter and the second quantization parameter of the bitstream, respectively, and $BD_I$ and $BD_O$ are respectively the bit depth of the bitstream and the reference bit depth, respectively.

12. A video decoding method comprising:

receiving a bitstream of an encoded video;

obtaining a bit depth of the bitstream from encoding information included in a header of the bitstream;

converting a first quantization parameter of the bitstream into a second quantization parameter based on a relationship between the first quantization parameter and a first quantization step size and a difference between a reference bit depth and the bit depth of the bitstream such that the relationship between the first quantization parameter and the first quantization step size is $QS_I = 2^{QPI/6}$ when the bit depth of the bitstream is 10 bits and the reference bit depth is 8 bits, where $QS_I$ is the first quantization step size and $QP_I$ is the first quantization parameter, the second quantization parameter having a different value than the first quantization parameter; and decoding the bitstream of the encoded video having the bit depth based on at least the second quantization parameter.

13. The method of claim 12, further comprising:

generating data of a spatial domain by based on residue data, the residue data being restored from a second transform coefficient of the bitstream using the second quantization parameter and data intra-predicted or inter-predicted from the bitstream; and generating a video output by performing SAO filtering on the data of the spatial domain using the second quantization parameter and a second offset.

14. The method of claim 13, further comprising:

generating the second offset by bit-shifting the first offset by the difference between the bit depth of the bitstream and the reference bit depth, in response to the bit depth of the bitstream is different from the reference bit depth.

15. The method of claim 13, further comprising:

generating the second transform coefficient by bit-shifting a first transform coefficient of the bitstream by the difference between the bit depth of the bitstream and the reference bit depth, in response to the bit depth of the bitstream being different from the reference bit depth.

16. The method of claim 15, further comprising:

restoring the residue data from the second transform coefficient of the bitstream based on a second quantization step size corresponding to the second quantization parameter.

17. The method of claim 12, wherein the converting comprises:

converting the first quantization parameter into the second quantization parameter based on:

$$QP_O = QP_I + 6 \times (BD_O - BD_I)(QP1 + 6 \times (BD_O - BD_I) \geq 0)$$
$$= QP1\ (QP_I + 6 \times (BD_O - BD_I) < 0),$$

where $QP_I$ and $QP_O$ are the first quantization parameter and the second quantization parameter of the bitstream, respectively, and $BD_I$ and $BD_O$ are the bit depth of the bitstream and the reference bit depth, respectively.

* * * * *